United States Patent
Liu et al.

(10) Patent No.: US 6,580,546 B2
(45) Date of Patent: Jun. 17, 2003

(54) FARADAY ROTATOR

(75) Inventors: Hongdu Liu, Fremont, CA (US); Shizhuo Yin, Fremont, CA (US); Daxin Liu, Mountain View, CA (US); Lee Lisheng Huang, Sunnyvale, CA (US)

(73) Assignee: Primanex, Fremont, CA (US)

( * ) Notice: Subject to any disclaimer, the term of this patent is extended or adjusted under 35 U.S.C. 154(b) by 117 days.

(21) Appl. No.: 09/922,545

(22) Filed: Aug. 3, 2001

(65) Prior Publication Data

US 2003/0025980 A1 Feb. 6, 2003

(51) Int. Cl.$^7$ .................................................. G02F 1/09
(52) U.S. Cl. ........................................ 359/280; 359/283
(58) Field of Search ............................... 359/280, 283, 359/282, 324; 324/244.1

(56) References Cited

U.S. PATENT DOCUMENTS 5,528,415 A * 6/1996 Gauthier et al. ............ 359/282
5,867,300 A * 2/1999 Onaka et al. ............... 359/283
6,275,323 B1 * 8/2001 Fukushima ................. 359/280

* cited by examiner

Primary Examiner—Georgia Epps
Assistant Examiner—Richard Hanig (57) ABSTRACT

The present invention relates to the use of magnetic materials in combination with magneto-optic materials to improve performance of Faraday rotator devices by enhancing the latching capability and reducing the driving current. Semi-hard magnetic materials are advantageously used in connection with some embodiments of the present invention. Placing such semi-hard magnetic materials in proximity with the magneto-optic material enhances latching and reduces the drive current required to cause switching. Encompassing both the magneto-optic material and the semi-hard magnetic material further reduces drive current requirements and enhances latching by reducing leakage of the magnetic field from its generation within the coil to the magneto-optic material. Some embodiments further include soft or semi-hard material encompassing the coil.

10 Claims, 7 Drawing Sheets

Hysteresis curve for different types of magnets

FARADAY ROTATOR

BACKGROUND

1. Technical Field

The present invention relates to the general field of Faraday rotators and, more particularly, to enhancing the performance of Faraday rotators including reducing drive current and improving latching capability.

2. Description of Related Art

Certain materials exhibit the property of rotating the plane of polarization of plane polarized light passing through the material when an external magnetic field is applied. This effect is known as the Faraday effect and we denote materials that exhibit the Faraday effect as "magneto-optic materials." Devices making use of applied magnetic fields to rotate the plane of polarization are known as Faraday rotators. Faraday rotators have been employed in components or subsystems in various optical devices including optical switches, isolators, circulators, attenuators, among other devices. The importance of such devices will increase as communication networks make increasing use of light as the means of communication.

Magneto-optic materials used in conventional Faraday rotators have several limitations. For example, some magneto-optic materials are incapable of switching. Such non-switching Faraday rotators can be used in isolators and circulators but lack the full range of applications of a switchable Faraday rotator. On the other hand, many switchable magneto-optic materials are not "latchable," or possess only poor latching capability. "Latching" denotes the ability to retain sufficient magnetic field on the magneto-optic material when the applied external magnetic field is removed such that the functionality of the Faraday rotator is not seriously degraded. One objective of the present invention relates to providing a Faraday rotator having switching functionality with latching capability.

However, merely achieving switching capability and latching capability in a Faraday rotator may not be sufficient to produce a practical commercial device. Other performance characteristics of a Faraday rotator are also desirable (or essential in some applications). For example, it is important in many applications that the magnetic field required to effect switching not be too large. Some magneto-optic materials typically used for latchable Faraday rotators can require quite large switching fields (e.g. possibly exceeding 1000 Oersteds ("Oe")). In general, for magneto-optic materials to be useful in practical switching applications, it is preferable to have a low coercive field $H_c$ such that switching does not require high current and power. Present Faraday rotators often require too much driving power to permit such switching Faraday rotators to be attractive components for use in most practical optical systems. The dual difficulties of lack of stable latching capability and the need for high switching current has precluded magneto-optic (Faraday rotator) switches from being widely used in optical switches.

In addition to the general difficulties of combining latching and low power switching discussed above, some magneto-optic materials may not be capable of performing the switching operation over the entire range of temperatures to which a commercial device may be subject (e.g. approximately 0° C. to approximately 65° C.). Achieving a Faraday rotator that is both switchable at reasonable field strengths and capable of latching behavior is one objective of the present invention.

Figure 1:
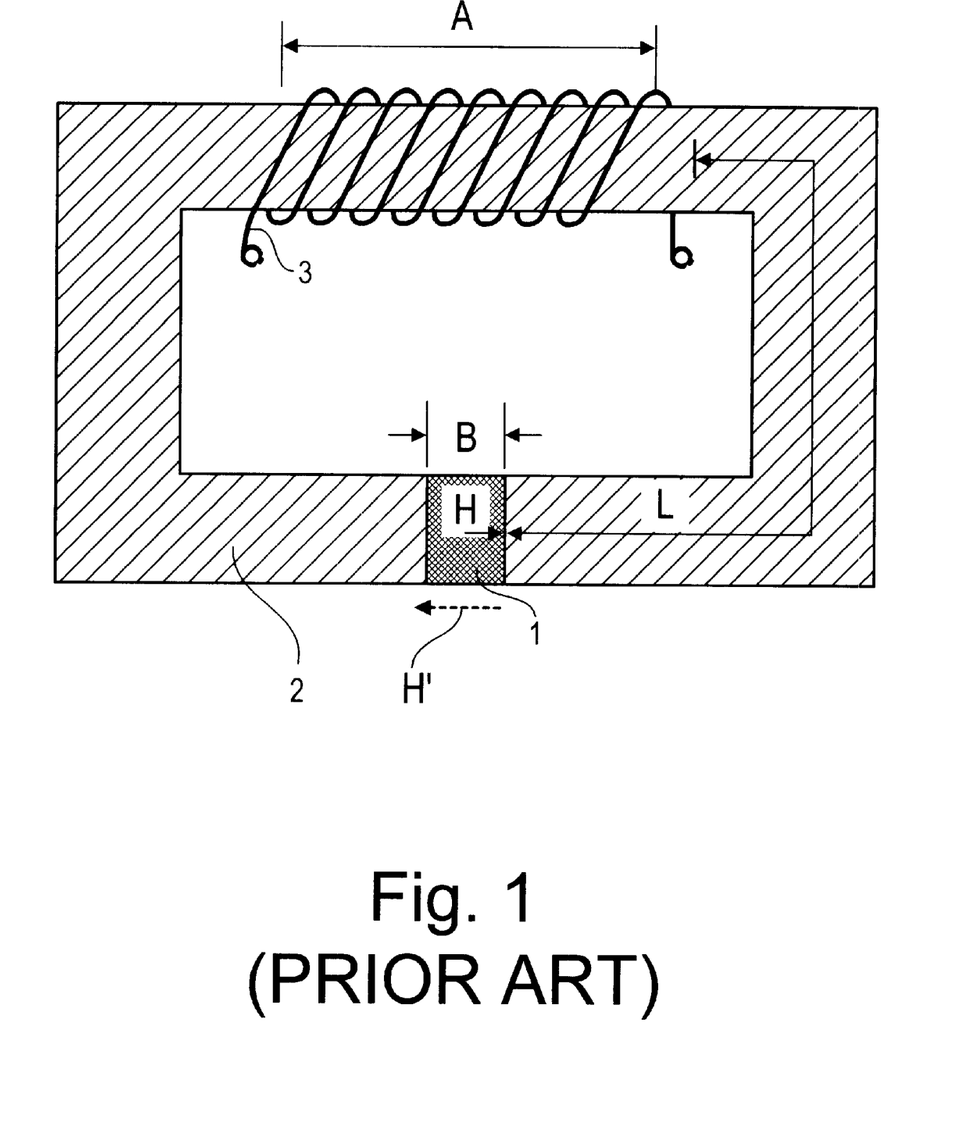
FIG. 1: A schematic, cross-sectional depiction of one example of a prior art Faraday rotator.

FIG. 1 depicts a conventional prior art Faraday rotator in a schematic, cut-away view (not drawn to scale), such as disclosed in the U.S. Pat. No. 4,609,257 to Shirasaki. The device of FIG. 1 includes a magneto-optic material 1, electromagnet including a current-carrying coil 3 generating a magnetic field, and a semi-hard magnetic material 2. In the operation of the Faraday rotator of FIG. 1, the electromagnet applies a magnetic field, H, to magneto-optic material, 1. Current flowing through coil 3 from left to right in FIG. 1 generates magnetic field H in the direction shown by the arrow H. To change the rotation direction of the Faraday rotator, the magnetic field is reversed by reversing the current in coil 3 causing a change in the direction of magnetization in the electromagnet, 2, to H' as shown by the broken arrow in FIG. 1.

However, the Faraday rotator depicted in FIG. 1 has several drawbacks, including the following: Since the coil, 3, encircles only portion of the magnet (i.e., Part A as shown in FIG. 1), the maximum magnetic field is delivered only to the material surrounded by coil 3. The part that closes to the magneto-optic material 1 (i.e., Part B as shown in FIG. 1) is significantly less strongly magnetized due to the distance L separating the magneto-optic material from the coil 3. Leakage of magnetic field occurs as the field traverses the space from A to B in FIG. 1. Since the magnetic reluctance of the magnetic circuit is proportional to the length of the path (i.e., path L as shown in FIG. 1) magnetic flux at Part A cannot be totally transmitted to the Faraday rotator 1 since the permeability of the intervening material is not infinite (as discussed in standard references including David Jiles, *Introduction to Magnetism and Magnetic Materials*, 2$^{nd}$ Ed. (Chapman & Hall, London), pages 54–57 (1998)). Thus, part of the magnetic energy generated by coil 3 is wasted. It follows that switching requires the application of sufficient current to coil 3 to produce the field strength necessary for switching as well as allowing for leakage between A and B. Reducing the current required for switching is one objective of the present invention.

The work of Shirasaki et. al. U.S. Pat. No. 5,812,304 adds a second source of magnetic field to the coil depicted in FIG. 1. The magnetic field generated by the second magnetic unit is perpendicular to the magnetic field generated by the first magnetic unit (i.e. the coil) in order to produce a more uniform magnetic field in the magneto-optic materials. However, in terms of magnetic field leakage, this work has the same limitations as those discussed in connection with FIG. 1.

Figure 2:
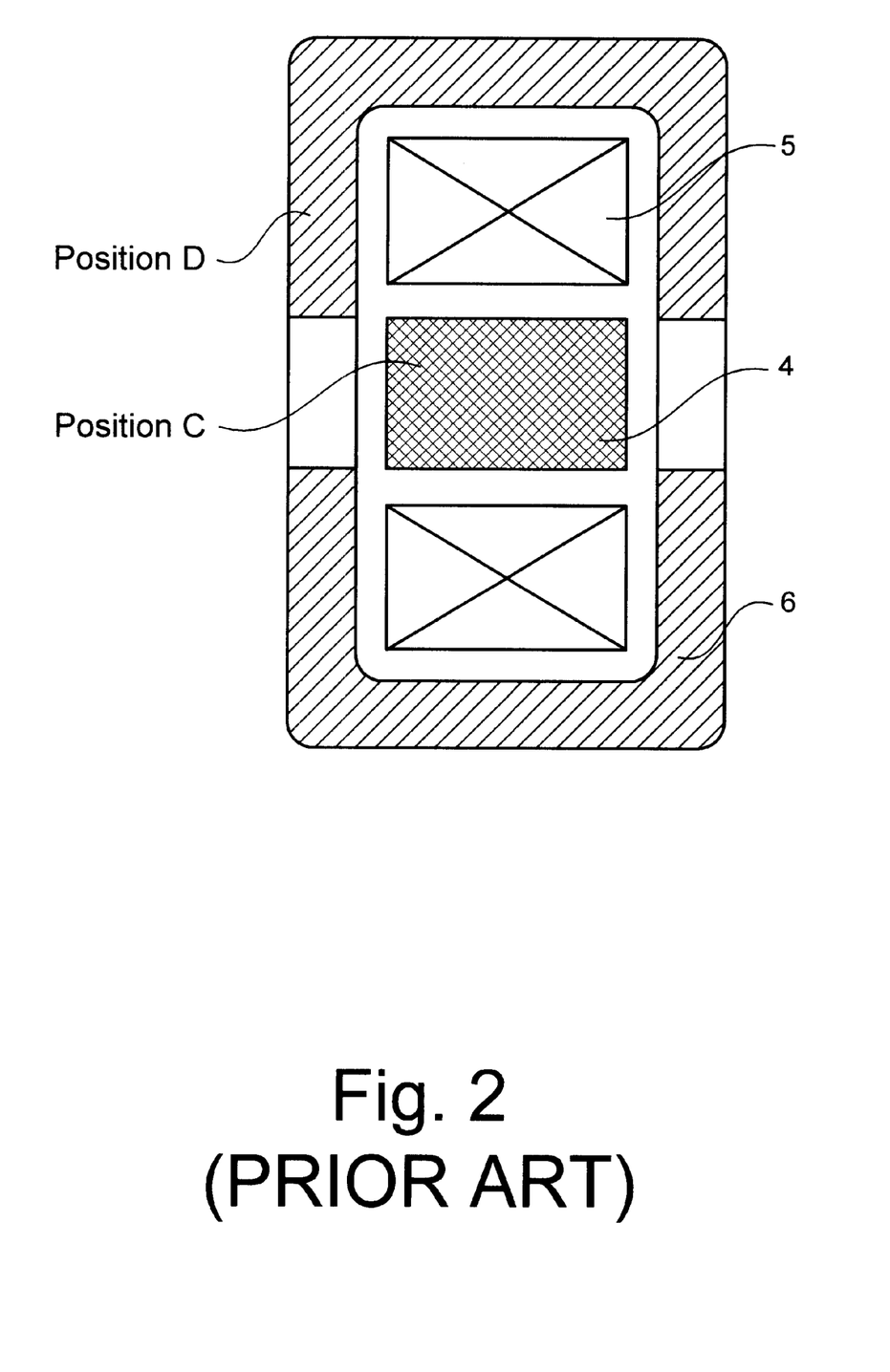
FIG. 2: A schematic, cross-sectional depiction of one example of a prior art Faraday rotator.

Takeda et. al. disclose in U.S. Pat. No. 5,048,937 a Faraday rotator depicted schematically in FIG. 2. The Takeda device consists of (a) magneto-optic material 4, (b) a wire coil 5 encircling the magneto-optic material for the purpose of changing the magnetization state of the Faraday rotator, and (c) a hollow yoke 6 surrounding the assembly of coil and magneto-optic material. Again, the coil 5 does not encircling the hollow yoke 6 pursuant to this disclosure. We note in connection with the Takeda reference that the maximal magnetic field of the solenoid coil is inside the coil (i.e., position C as depicted in FIG. 2). Since the hollow yoke is located outside of the coil, the magnetic field at the position of the hollow yoke (i.e., position D) generated by the coil is much smaller than the magnetic field at position C within the coil. Thus, this device has the disadvantage of not effectively magnetizing the hollow yoke.

Figure 3:
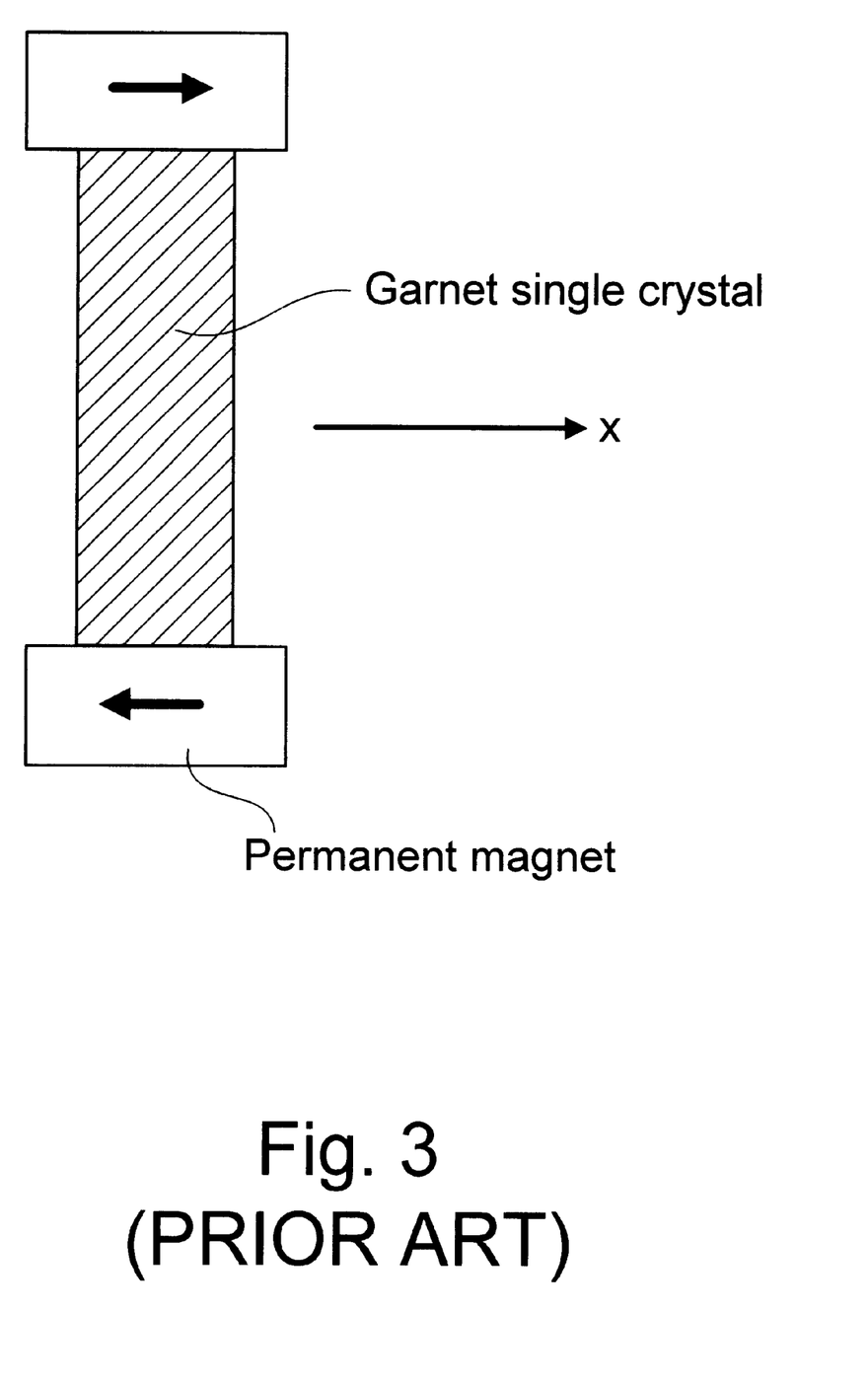
FIG. 3: A schematic, cross-sectional depiction of one example of a prior art Faraday rotator including permanent magnets positioned on either side of a magnetic garnet.

FIG. 3 depicts a Faraday rotator as disclosed Shirai et. al. in U.S. Pat. No. 5,535,046. In this design, a portion of a magnetic garnet film is exposed to a localized magnetic field. As depicted in FIG. 3, magnetic fields directed in antiparallel directions are applied in different localized portions of the magnetic garnet film by permanent magnets. A coil provides a magnetic field in addition to the field generated by the permanent magnets for the purpose of altering the total field applied to the magneto-optic material. The coil is not depicted in FIG. 3.

FIG. 3 depicts the upper localized magnetic field as directed in the positive x-axis direction, while the lower localized magnetic field is directed in the negative x-axis direction. The field applied to the magneto-optic material by the external coil lies in either the positive or negative x direction. Therefore, there is always a localized magnetic field that is directed in the direction opposite to that of the applied external magnetic field. Under these conditions the single domain structure of the magnetic field within the magneto-optic material cannot be maintained when the external applied magnetic intensity is removed. Thus, the design depicted in FIG. 3 functions mainly to remove the latching effect of magnetic garnet. However, this is contrary to one of the objectives of the present invention of enhancing the latching capability of the Faraday rotator. The present invention discloses a technique distinct to that of FIG. 3 for enhancing latching.

SUMMARY

The present invention relates to the use of magnetic materials in combination with magneto-optic materials to improve performance of Faraday rotator devices by enhancing the latching capability and reducing the driving current. Semi-hard magnetic materials are advantageously used in connection with some embodiments of the present invention. Placing such semi-hard magnetic materials in proximity with the magneto-optic material enhances latching and reduces the drive current required to cause switching. Encompassing both the magneto-optic material and the semi-hard magnetic material further reduces drive current requirements and enhances latching by reducing leakage of the magnetic field from its generation within the coil to the magneto-optic material. Some embodiments further include soft or semi-hard material encompassing the coil. Semi-hard magnetic materials having coercivities in the range from approximately 20 to approximately 100 Oe are advantageously used.

BRIEF DESCRIPTION OF THE DRAWINGS

The drawings herein are not to scale.

DETAILED DESCRIPTION

Faraday rotation is a magneto-optic effect in which the plane of polarization of plane polarized light is caused to rotate by passage through a magneto-optic material to which is applied an external magnetic field. The combination of magneto-optic material and a means for application of an external magnetic field is a "Faraday rotator," denoted succinctly as a "rotator." The rotatory power, $\rho$, denotes the angle through which the plane of polarization is rotated per unit length traversed by the light through the magneto-optic material. Typically, $\rho$ is approximately proportional to the intensity of the magnetic field applied to the magneto-optic material in the direction of propagation of the light through the material as in Eq. 1.

$$\rho = V \cdot H_\parallel \qquad \text{Eq. 1}$$

in which:

$\rho$=the rotation angle of the plane of polarization per unit length passage through the magneto-optic material.

$H_\parallel$=the magnitude of the component of the magnetic field applied to the magneto-optic crystal in the direction of light propagation.

V=Verdet constant; a constant of proportionality dependent on the particular magneto-optic material.

The direction of rotation is governed by the direction of the magnetic field and the sign (+ or −) of the Verdet constant. For example, when V>0, the rotation of the plane of polarization is in the direction of a right-handed screw pointing in the direction of the magnetic field. The total angle of rotation, $\theta$ when passing through a distance D of magneto-optic material is given by Eq. 2.

$$\theta = \rho D \qquad \text{Eq. 2}$$

Figure 4:
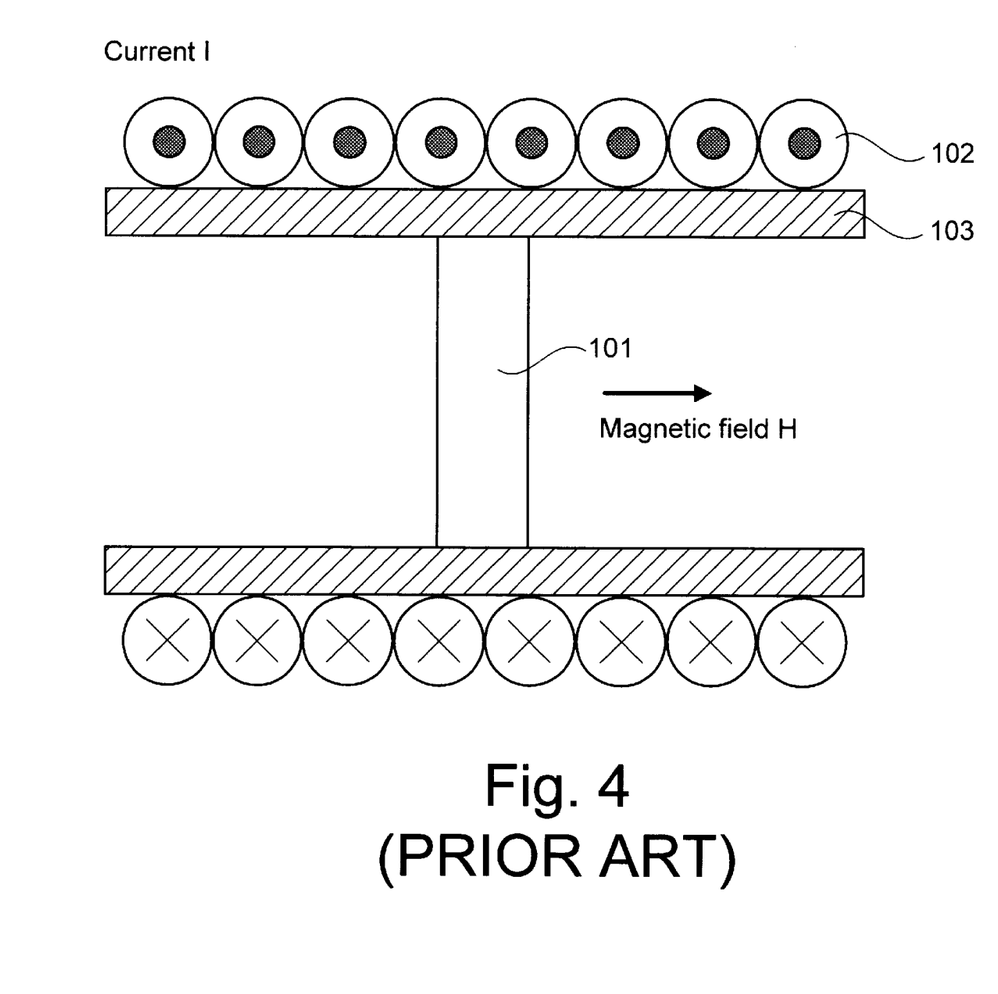
FIG. 4: A schematic, cross-sectional depiction of a conventional Faraday rotator.

FIG. 4 is a schematic, cross-sectional depiction of a conventional Faraday rotator (not to scale) comprising a magneto-optic material 101, a coil 102 for applying a magnetic field to material 101, and a suitable support structure 103. Magneto-optic material 101 is typically a magnetic garnet although other materials can be used including YIG (yttrium-iron-garnet) thin films, TGG (terbium-gallium-garnet), ThAlG (terbium-aluminum-garnet), among others. Current passing through coil 102 generates the magnetic field H that is applied to material 101. We use conventional notation that an encircled "●" denotes current flowing out of the plane of the page and an encircled "X" denotes current flowing into the plane of the page. Current flowing in the sense depicted in FIG. 4 generates the magnetic field H from left to right in FIG. 4.

The present invention relates to Faraday rotators having reduced switching current requirements (also called drive current) and improved latching capabilities in comparison with typical prior art rotators. Typical embodiments of the present invention employ "semi-hard" magnetic materials (or, in brief, "semi-hard materials"). Semi-hard materials are typically characterized in terms of their magnetization behavior as intermediate between "hard" and "soft" magnetic materials. Hard, soft and semi-hard are not precisely defined terms but denote qualitative magnetic behavior. One author (Jiles supra, 96–97 pages) characterizes hard and soft on the basis of the coercivities, $H_c$. According to this author, "hard" magnetic materials typically a coercivity above approximately 125 Oe and "soft magnetic materials" have a coercivity below approximately 12.5 Oe.

Figure 7:
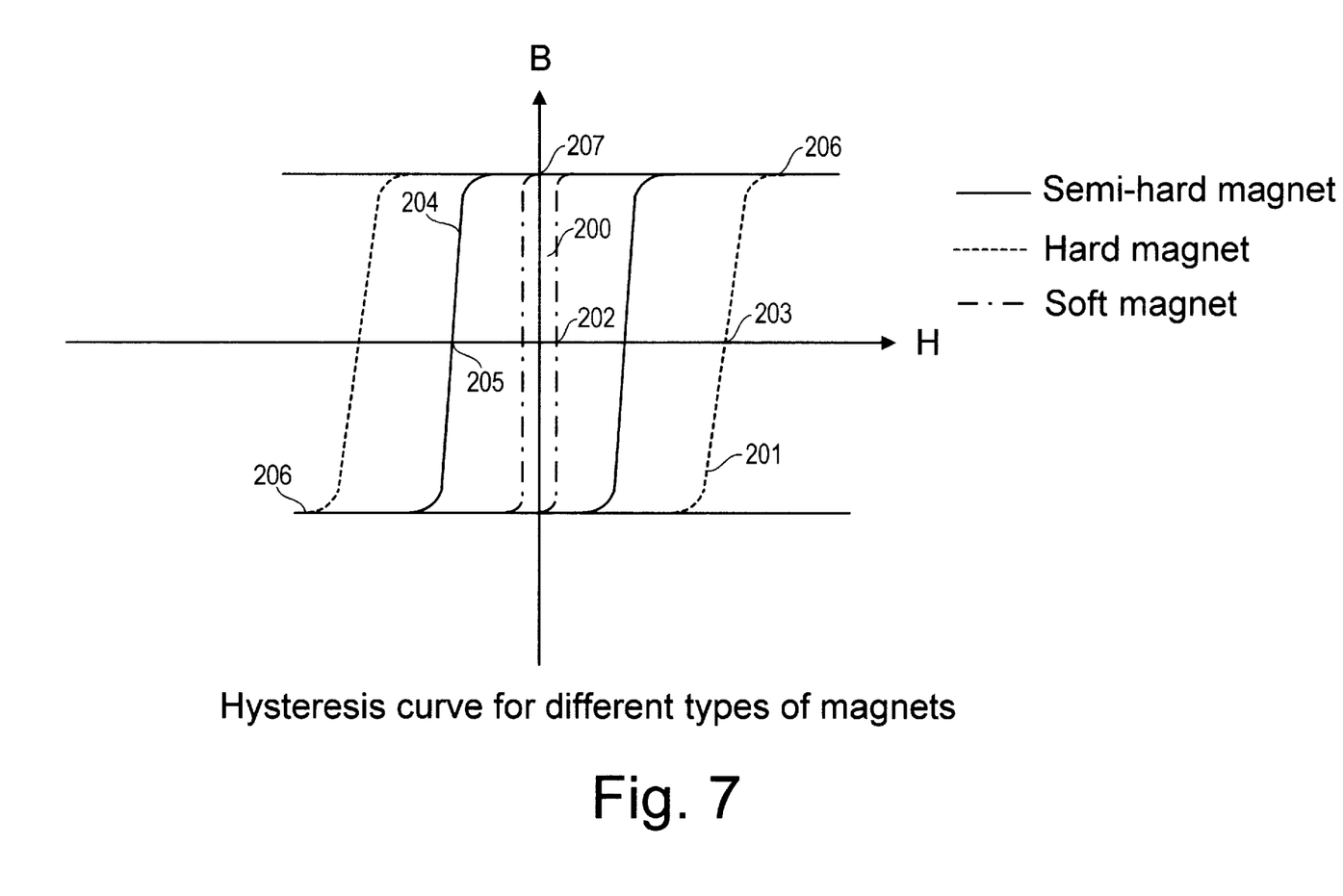
FIG. 7: Hysteresis curves for typical hard, semi-hard and soft magnetic materials.

FIG. 7 depicts exemplary hysteresis curves for typical cases of "hard" magnetic materials, 201 and "soft" magnetic materials 200. The hysteresis curve plots the magnetic induction B (the magnetic field induced by application of field H), as a function of the applied field H. Hard and soft materials are conventionally characterized in terms of their magnetic coercivity, $H_c$, defined as the demagnetizing force required to reduce the residual induction to zero. For purposes of Faraday rotators described herein, semi-hard magnetic materials are defined to have a different range of coercivity from that used by Jiles supra. Typical values for $H_c$ for semi-hard magnetic materials are in the range of approximately 10 Oe to approximately 1000 Oe. That is, $H_c$ for soft materials are less than about 10 Oersted (point 202) and for hard magnetic materials greater than about 1000 Oersted (point 203). Semi-hard magnetic materials are intermediate between soft and hard and generate hysteresis curves intermediate between 200 and 201. One such curve is given in FIG. 7 as 204. It should be emphasized that the designations "soft," "hard" and "semi-hard" are approximate only and precise dividing lines between categories do not exist. In particular, hysteresis behavior for semi-hard materials can assume numerous shapes and values in addition to that depicted as 204. However, for purposes of description, curve 204 adequately demonstrates the behavior of typical semi-hard materials that are useful for employment in connection with the present invention. Semi-hard magnetic materials are commercially available from numerous vendors.

Figure 5:
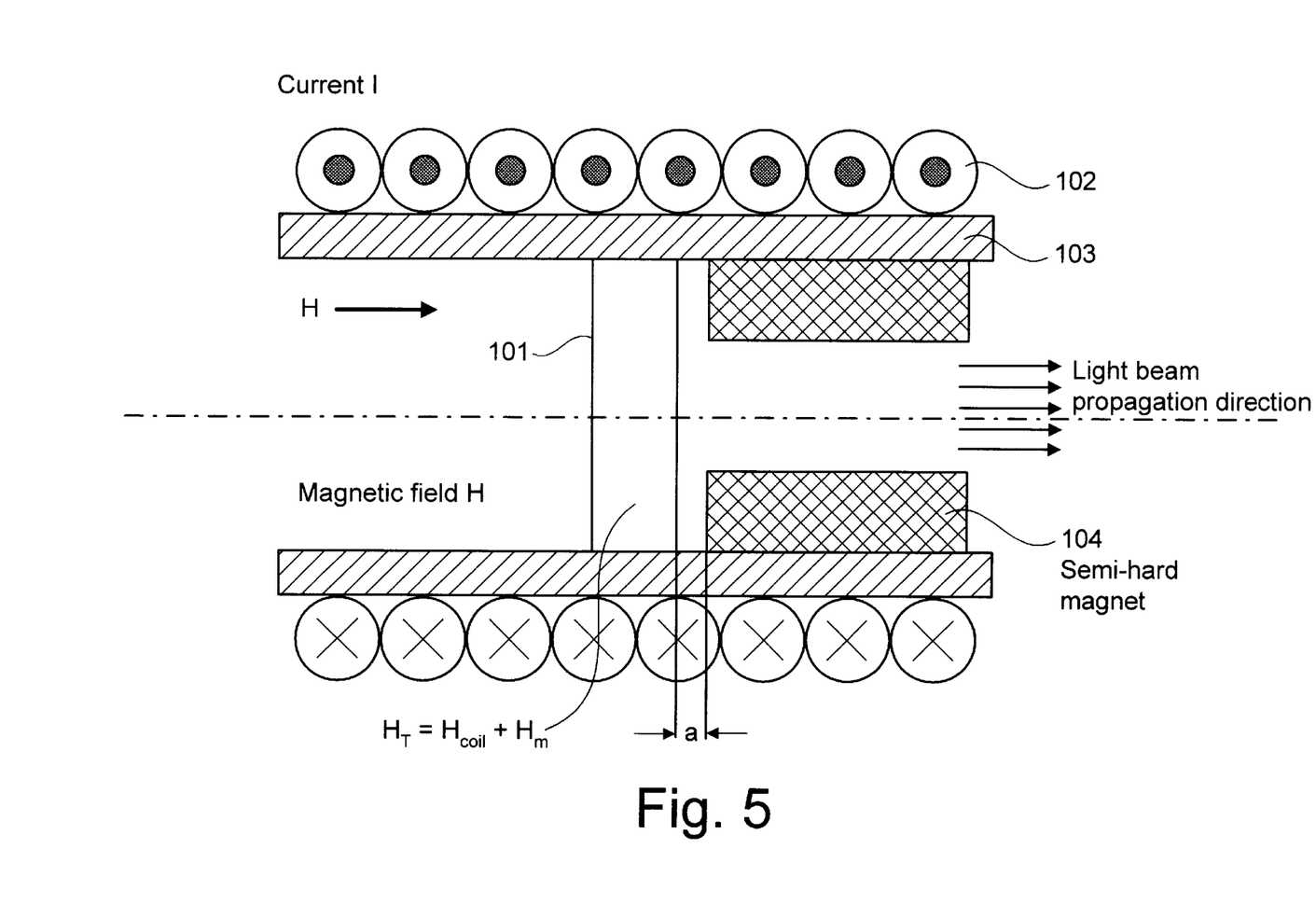
FIG. 5: A schematic, cross-sectional depiction of a Faraday rotator including semi-hard magnetic material pursuant to some embodiments of the present invention.

FIG. 5 depicts a cross-sectional schematic view of a Faraday rotator pursuant to some embodiments of the present invention including a semi-hard magnetic material, 104, at a spacing "a" from the magneto-optic material 101 where $a \geq 0$. In these embodiments of the present invention, the coil 102 covers both magneto-optic material 101 and semi-hard magnetic material 104. The depiction of FIG. 5 is rotationally symmetric about the central axis of the Faraday rotator that is also the light propagation direction in FIG. 5. However, this is not an essential characteristic and Faraday rotators having other configurations of components, including those lacking rotational symmetry, are included within the scope of the present invention. In general, an unimpeded light path through the magneto-optic material 101 is required in practical rotators, which is consistent with rotators having many different shapes or cross-sections when viewed along the direction of light propagation. For example, square, elliptical or any closed geometrical figure enclosing the path of light propagation can be used.

Typical structures for a Faraday rotator as generally depicted in FIG. 5 and found to be useful in practical applications, have a cylindrical coil 102 approximately 5 mm in diameter and approximately 5 mm long. The semi-hard magnetic material has a coercivity in the range from approximately 10 Oe to approximately 1000 Oe, advantageously in the range from approximately 20 Oe to approximately 100 Oe. When a current in the range of approximately 100 mA to 200 mA is carried by the coil, a magnetic field of approximately 400 Oe is generated within the coil. Semi-hard material 104 typically occupies the region within coil 102 (and support structure 103, if present), leaving a path approximately 2 mm in diameter for light to traverse the rotator.

There are several improvements and distinctions between the Faraday rotators depicted in FIG. 5 and prior art rotators, including those depicted in FIGS. 1, 2 and 3. For example, FIG. 5 the coil generating the applied field H encompasses both the magnetic material 104 and the magneto-optic material 101. This is in contrast to the prior art described above in which the coil is separated from the magneto-optic material, permitting leakage of magnetic field to detract from the field delivered to the magneto-optic material. 2 and Faraday rotator 1. This configuration helps to reduce the needed switching current by reducing leakage.

Some embodiments of the present invention have the capability to take advantage of the uniquely thin geometry of modern magneto-optic materials as used in optics communications. For example, the thickness of a magnetic garnet magneto-optic material is typically less than about 500 microns (1 micron=$10^{-6}$ meter). This thickness is much smaller than the typical length, A, of the coil 3 as shown in FIG. 1 (e.g., the typical value of A is larger than 5 mm). Thus, the design of the present invention does not significantly change in terms of total magnetized volume for the same length, A, of the coil. Furthermore, since the magnetized part of semi-hard magnetic material 104 is very close to (or contacting) the Faraday rotator 101 in some embodiments of present invention, the previously mentioned leakage problem is reduced. In other words, the transmission length "L" becomes effectively zero. This is one of the major differences from the prior art as discussed above.

The application of current I to coil 102 creates a magnetic field $H_{coil}$ at the location of the magneto-optic material. However, the total field applied to the magneto-optic material 101, $H_T$ is the vector sum of $H_{coil}$ and the magnetization induced in material 104, $H_m$. More precisely, $H_{coil}$ is the magnetic field at the location of the magneto-optic material produced by coil 102. $H_m$ is the magnetic field produced at the location of the magneto-optic material by the magnetization of semi-hard material 104. Explicitly, the magnetic field experienced by the magneto-optic material 101 given by Eq. 3 in which boldface denotes vector field quantities.

$$H_T = H_{coil} + H_m \qquad \text{Eq. 3}$$

From Eq. 2, only the component of $H_T$ parallel to the direction of the light passing through the magneto-optic material is effective in causing rotation of polarization. However, for definiteness, we provide a detailed description for the case depicted in FIG. 5 of $H_{coil}$ and $H_m$ being substantially parallel to the long axis of the Faraday rotator along which the light propagates through the rotator. Therefore, we omit the vector notation for simplicity, understanding thereby that this is a special case of Eq. 3. Generalization to vectors in three dimensional space via Eq. 3 is straight forward and included within the scope of the present invention.

The spacing "a" depicted in FIG. 5 is typically selected to be the minimum spacing at which the semi-hard magnetic material, 104, can be located with respect to the magneto-optic material. The spacing "a" may change from zero to some optimum value, or larger. The typical value for "a" is less than 0.5 mm.

Figure 6:
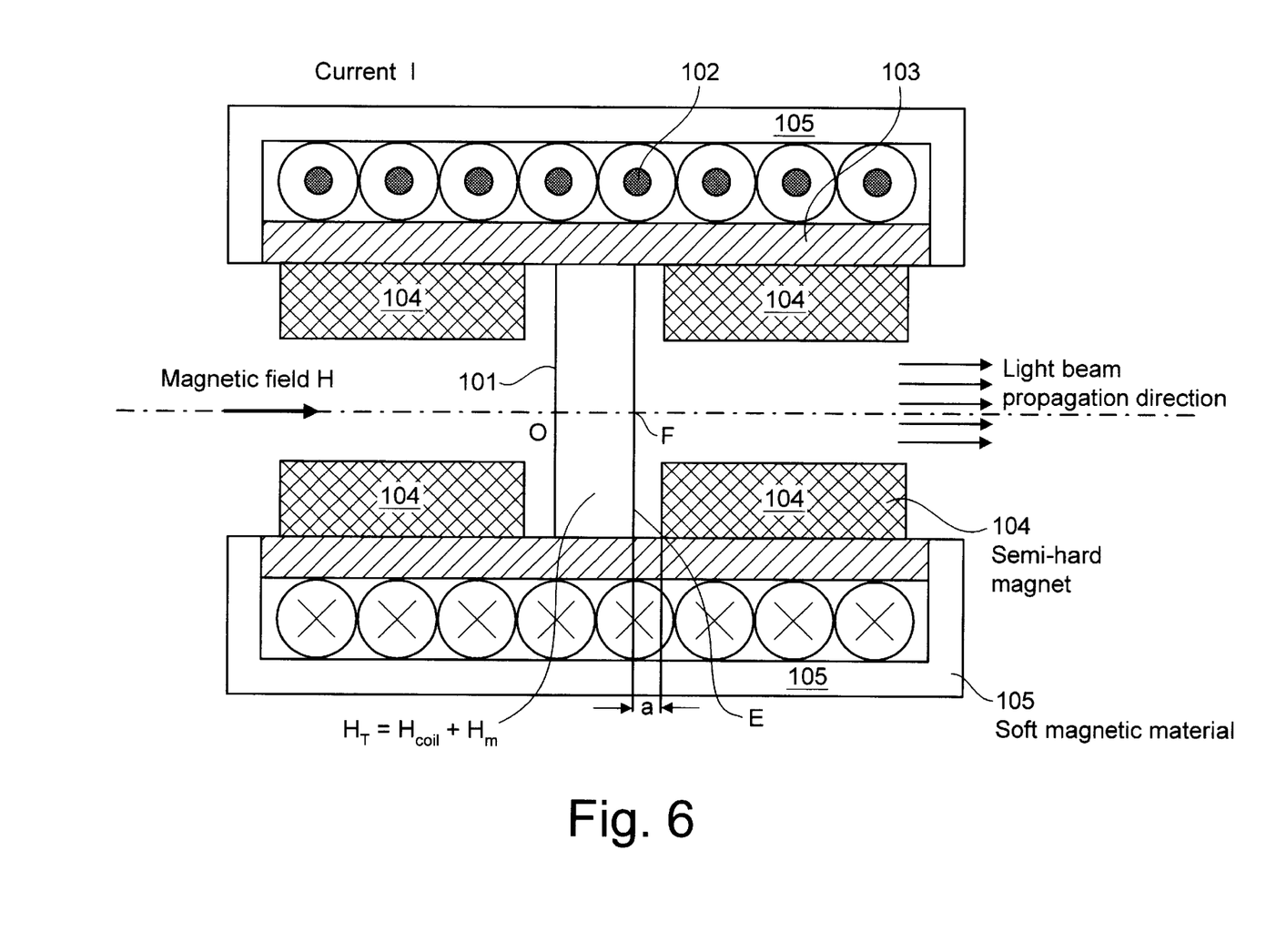
FIG. 6: A schematic, cross-sectional depiction of Faraday rotator including semi-hard and soft magnetic materials pursuant to some embodiments of the present invention.

It is convenient for semi-hard material 104 to be axially symmetric with respect to the Faraday rotator. For example, one may add another piece of semi-hard material 104 in the design, as depicted in FIG. 6. However, symmetric placement of semi-hard material is not an essential limitation of the present invention and other configurations of semi-hard material can be employed, not necessarily restricted to any particular symmetric placement of semi-hard material, within the scope of the present invention. We note that the utility of Faraday rotators in many applications is not seriously affected by non-uniformity of applied magnetic field, permitting large variations in the placement of semi-hard materials, within the scope of the present invention.

It is advantageous that $H_{coil}$ be substantially larger than the coercive force of the semi-hard material to achieve effective switching. A typical rule of thumb is that $H_{coil}$ should be at least about three times coercive force of the semi-hard material. That is, if $H_c$ denotes the coercive force of semi-hard material 101, it is convenient for Eq. 4 to be satisfied.

$$3H_c < H_{coil} \qquad \text{Eq. 4}$$

Eq. 4 is not a strict requirement and there is some variation for different materials. Satisfying Eq. 4 helps ensure that the magnetic field direction of magnetization, $H_m$ is in the same direction as $H_{coil}$.

Other embodiments of the present invention make use of configurations having closed loop magnet circuit that further concentrate the magnetic flux in the region of the magneto-optic material 101. FIG. 6 illustrates an example of such a closed loop approach, comprising a magneto-optic material 101 (e.g., a magnetic garnet), a coil 102, a holder for the coil 103, a semi-hard magnetic material 104, and soft magnetic materials 105 having a yoke-like shape. The semi-hard magnetic material 104 and magneto-optic material 101 forms a sandwich structure as shown in FIG. 6. As mentioned previously, the separation distance "a" have a range of values from zero to a certain appropriate value. In general, the distance "a" is typically less than approximately 0.5 mm. Yoke-shaped soft magnet 105 connects the semi-hard magnet 104 so that a closed loop magnetic circuit is formed. This closed loop architecture enhances the magnetic field passing through the magneto-optic material 101, which, in turn, enhances the latching capability of the rotator (due to the larger remaining magnetic field after removing the driving current from the coil). This configuration also reduces the driving current due to the further increase in the magnetic flux around magneto-optic material 101 resulting from the presence of additional semi-hard material. The coil holder 103 is optional. The sandwich structure formed by magneto-optic material 101 and semi-hard magnet 104 may provide sufficient mechanical support for the coil without introducing additional supporting structural elements, 103. A rigid coil structure can also allow the device of FIG. 1 (lacking the yoke-shaped soft magnet) to be constructed without the structural support member, 103.

Some embodiments of the present invention have the coil 102 encircling both the magneto-optic material 101 and semi-hard magnet 104. This is a more effective approach than typical prior art, as noted above. First, since semi-hard magnet 104 and magneto-optic material 101 are very close (and may be even in contact) as shown in FIGS. 5 and 6, there is much smaller leakage of magnetic field generated by the magnetized semi-hard magnet than that of prior art architectures (e.g., the architecture shown in FIG. 1). Second, in some embodiments of the present invention, soft magnetic material is used to form the encircling part of magnetic circuit loop (i.e., yoke-shaped part 105). This replacement offers several advantages including the following: Since the semi-hard magnetic material is essentially totally encompassed by the coil (at least in the region in proximity to magneto-optic material 101), the magnetic field direction of the semi-hard magnet will always follow the magnetic field direction of the coil. It is, therefore, not possible to have a remaining magnetic field that is in the opposite direction to the magnetic field direction of the coil. However, such an oppositely-directed remaining field can occur in the above prior art designs (such as shown in FIG. 1) because part of the semi-hard magnet (i.e., part B as shown in FIG. 1) is not encompassed by the coil and may not change the magnetization direction when the current direction of the coil has been reversed. In addition, soft magnetic material are usually cheaper than semi-hard materials magnet such that use of soft materials as 105 can reduce the cost of the rotator.

Other embodiments of the present invention make use of magnetic saturation (206 in FIG. 7) to "latch" the Faraday rotator in a particular state without the need for continuously supplying current to the coil. $H_{coil}$ is applied to the semi-hard material and drives it to its saturated region, 206. Current to the coil is stopped (H=0 in FIG. 7) and, due to hysteresis, B is typically not zero, but value 207. Thus, a remaining magnetization is applied to magneto-optic material 101 even when current to coil 102 is zero. This remaining magnetic field assists in latching the state of Faraday rotator, retaining rotatory power. The configurations in some embodiments of the present invention provides a significant remaining magnetic field (after turning off the coil current) due to the closed loop magnetic circuit design as shown in FIG. 6. This significant remaining magnetic field substantially enhances the latching capability of the Faraday rotator. In other words, the Faraday rotator has been "latched" into a particular state where it will remain until changed by application of a reverse current to the coil sufficiently large to displace the magnetization to the other branch of the hysteresis curve. Note that, in the design depicted in FIG. 6, the position "E" (and symmetrically equivalently positions) have maximal remaining magnetic field. The remaining magnetic field at position "E" is larger than that of position "F". Due to the large remaining magnetic field at position "E", the magnetization direction at position "E" is latched to the external magnetizing field direction. This latching part provides a latching "seed" and this latching seed assists the latching of the entire magneto-optic material, including the part at position "F".

Having described the invention in detail, those skilled in the art will appreciate that, given the present disclosure, modifications may be made to the invention without departing from the spirit of the inventive concept described herein. Therefore, it is not intended that the scope of the invention be limited to the specific and preferred embodiments illustrated and described.

We claim:

1. A Faraday rotator device comprising:
   a) magneto-optic material; and,
   b) semi-hard magnetic material located in proximity to said magneto-optic material such that magnetization of said semi-hard magnetic material affects the magnetic field at the location of said magneto-optic material; and,
   c) a coil encompassing said magneto-optic material and said semi-hard magnetic material in proximity to said magneto-optic material, such that current passing through said coil generates a magnetic field at the location of said magneto-optic material and at the location of said semi-hard magnetic material.

2. A device as in claim 1 further comprising second semi-hard magnetic material having a location such that said coil is located between said semi-hard magnetic material and said second semi-hard magnetic material.

3. A device as in claim 2 wherein said second semi-hard magnetic material encompasses said coil.

4. A device as in claim 1 further comprising soft magnetic material having a location such that said coil is located between said semi-hard magnetic material and said soft magnetic material.

5. A device as in claim 1 wherein the coercivity of said semi-hard magnetic material is in the range from approximately 10 Oersteds to approximately 1000 Oersteds.

6. A device as in claim 5 wherein the coercivity of said semi-hard magnetic material is in the range from approximately 20 Oersteds to approximately 100 Oersteds.

7. A device as in claim 1 wherein said semi-hard magnetic material is disposed having axial symmetry about the central axis of said coil.

8. A device as in claim 1 wherein said semi-hard magnetic material is disposed on both sides of said magneto-optic material along the central axis of said coil.

9. A method of latching a Faraday rotator comprising:

a) providing magneto-optic material; and, b) providing semi-hard magnetic material in proximity to said magneto-optic material; and, c) applying a magnetic field to said semi-hard magnetic material of sufficient field strength such that said semi-hard magnetic material remains magnetized upon removal of said field.

10. A method as in claim 9 wherein said magnetic field derives from a current-carrying coil encompassing said magneto-optic material and said semi-hard magnetic material.

* * * * *